US007211809B2

(12) United States Patent
Maezawa et al.

(10) Patent No.: US 7,211,809 B2
(45) Date of Patent: May 1, 2007

(54) RADIOGRAPHIC IMAGE CONVERSION PANEL

(75) Inventors: Akihiro Maezawa, Hino (JP); Noriyuki Mishina, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 188 days.

(21) Appl. No.: 10/794,535

(22) Filed: Mar. 5, 2004

(65) Prior Publication Data

US 2004/0178360 A1 Sep. 16, 2004

(30) Foreign Application Priority Data

Mar. 13, 2003 (JP) ............................ 2003-067862

(51) Int. Cl.
*H05B 33/00* (2006.01)

(52) U.S. Cl. .................................................. 250/484.4

(58) Field of Classification Search .............. 250/484.4
See application file for complete search history.

(56) References Cited

U.S. PATENT DOCUMENTS 3,371,009 A * 2/1968 Traynor, Jr. et al. ........ 442/254
4,505,989 A 3/1985 Umemoto et al.
6,287,674 B1 * 9/2001 Verlinden et al. ........... 428/210
2002/0166977 A1 * 11/2002 Kohda et al. ............ 250/484.4
2002/0195578 A1 * 12/2002 Yanagita et al. ............ 250/581
2006/0065863 A1 * 3/2006 Takasu et al. .............. 250/581

FOREIGN PATENT DOCUMENTS

EP 1 191 544 3/2002
EP 1 276 117 1/2003

* cited by examiner

*Primary Examiner*—David Porta
*Assistant Examiner*—David S. Baker
(74) *Attorney, Agent, or Firm*—Lucas & Mercanti, LLP

(57) ABSTRACT

In a radiographic image conversion panel including a photostimulable phosphor layer on a support, at least one layer of the photostimulable phosphor layer is formed by a deposition method and has a film thickness of 50 μm to 10 mm, and the support includes a plurality of layers of two or more kind.

2 Claims, 2 Drawing Sheets

RADIOGRAPHIC IMAGE CONVERSION PANEL

BACKGROUND OF THE INVENTION

1. Field of the Invention

The present invention is related to a radiographic image (hereinafter also referred to as a radiograph) conversion panel and a method for manufacturing the same.

2. Description of the Related Art

In earlier technology, so-called radiography in which silver salt is used to obtain a radiological image has been utilized. However, the method for imaging a radiological image without silver salt has been developed. That is, the method of imaging by a phosphor absorbing the radial ray transmitted through a subject in a phosphor, thereafter, excited by certain type of energy, and radiating radiological energy accumulated in the phosphor as fluorescence, is disclosed.

A concrete example of a radiographic image conversion method is known, in which a panel comprising and a photostimulable phosphor layer provided on a support (hereinafter also referred to as base material) is applied, and both of/either visible light and/or infrared light is used as excitation energy (see U.S. Pat. No. 3,859,527).

A radiographic image conversion method using a photostimulable phosphor of higher luminance and sensitivity has been developed. A radiographic image conversion method using a BaFX: $Eu^{2+}$ system (X: Cl, Br, I) phosphor disclosed in JP Tokukaisho-59-75200A, a radiographic image conversion method using an alkali halide phosphor disclosed in such as JP Tokukaisho-61-72087A, and an alkali halide phosphor containing metals of $Tl^{+}$ $Ce^{3+}$, $Sm^{3+}$, $Eu^{3+}$, $Y^{3+}$, $Ag^{+}$, $Mg^{2+}$, $Pb^{2+}$ and $In^{3+}$ as a co-activator disclosed in JP Tokukaisho-61-73786A and 61-73787A are the examples.

In late years, in analysis of a diagnostic image, a radiographic image conversion panel having higher sharpness has been required.

As a method for improving the sharpness, for example, attempts of controlling the shape of photostimulable phosphor itself have been made in order to improve sensitivity and sharpness.

One of these attempts is, for example, a method of using a fine quasi-columnar photostimulable phosphor layer deposited on a support having a fine concavoconvex pattern, which is disclosed on JP Tokukaisho-61-142497A.

Further, the following methods and the like are also proposed; as disclosed in JP Tokukaisho-61-142500A, a method of using a radiographic image conversion panel having a photostimulable phosphor layer in which the cracks of a columnar photostimulable phosphor deposited on a support having a fine pattern are further developed with shock-treatment; as disclosed in JP Tokukaisho-62-39737A, a method of using a radiographic image conversion panel having a photostimulable phosphor layer cracked from the surface side to be quasi-columnar pattern; and, as disclosed in JP Tokukaisho-62-110200A, a method of forming a photostimulable phosphor layer having pores onto a support by deposition, subsequently the pores developped to be cracks with heat treatment.

Furthermore, as disclosed in JP Tokukaihei-2-58000A, a radiographic image conversion panel having a photostimulable phosphor layer in which elongated columnar crystals having definite angle based on a normal line of a support is formed by a vapor phase deposition method.

Every one of these methods of controlling the shape of a photostimulable phosphor layer can remarkably increase the sharpness of the photostimulated luminescence image, because a photostimulable phosphor layer is formed pillar shape so that photostimulated excited light or photostimulable luminescence is restrained to diffuse horizontally (a light reflects repeatedly on interface of cracks (of pillar crystal) to reach the surface of a support).

In late years, a radiographic image conversion panel using alkali halide such like CsBr as a base material is proposed. Especially when Eu is used as an activator, the improvement of X ray conversion efficiency, which has not achieved before, is expected (JP Tokukai-2002-72381A).

However, a deposition method for forming a membrane is required to form a CsBr: Eu phosphor layer. A base plate and a vapor source are located with high accuracy in order to control the membrane thickness distribution. Thus highly accurate membrane thickness distribution is achieved.

There is a problem especially in CsBr:Eu that Eu is distributed unevenly in the base material because vapor pressure of Eu in a vacuum state and predominant dispersion of Eu by heat is predominant. As a result, the structure of a deposition device and a location of a base plate and a vapor source highly affect the homogeneity of activator in a phosphor layer (For example, JP Tokukai-2002-72381A, 2002-20742A and 2002-6092A).

It is required that a board material with high rigidity is applied as an evaporation base board in order to improve accuracy of film thickness.

A stainless steel represented by Fe—Ni—Cr, a glass practically used in liquid crystal display and the like are known as base material with high rigidity. However, in relation to a radiographic image conversion panel using photostimulable phosphor that are used for X ray in medical use, the desired performance is not obtained since X ray is radiated from base material side (the opposite side of the phosphor side). As a result, there is a problem that the rigidity and X ray absorption of base material are incompatible.

For these reasons, the improvement of the homogeneity of activator in a phosphor layer has been required in order to improve the luminance and the sharpness of a radiographic image conversion panel, which are demanded from a market.

SUMMARY OF THE INVENTION

The present invention has made to resolve the above-described problems, and the object of the present invention is to provide a radiographic image conversion panel having superior homogeneity of an activator in a photostimulable phosphor layer, high luminance and high sharpness.

In order to resolve the above-described problems, according to the first aspect of the present invention, a radiographic image conversion panel comprises a photostimulable phosphor layer on a support, wherein at least one layer of the photostimulable phosphor layer is formed by a vapor phase method and has a film thickness of 50 μm to 10 mm, and the support comprises a plurality of layers of two or more kind.

Where the vapor phase method represents a vapor phase deposition method.

At least one layer of the photostimulable phosphor layer preferably comprises a photostimulable phosphor in which an alkali halide represented by the following general formula (1) is a base material;

$$M^1X \cdot aM^2X' \cdot bM^3X'':eA \qquad \text{general formula (1)}$$

[In the formula, the $M^1$ is at least one kind of alkali metal selected from a group of Li, Na, K, Rb and Cs, the $M^2$ is at least one kind of bivalent metal selected from a group of Be, Mg, Ca, Sr, Ba, Zn, Cd, Cu and Ni, the $M^3$ is at least one kind of trivalent metal selected from a group of Sc, Y, La, Ce, Pr, Nd, Pm, Sm, Eu, Gd, Tb, Dy, Ho, Er, Tm, Yb, Lu, Al, Ga and In, each of the X, the X' and the X" is at least one kind of halogen selected from F, Cl, Br and I, the A is at least one kind of metal selected from a group of Eu, Tb, In, Ce, Tm, Dy, Pr, Ho, Nd, Yb, Er, Gd, Lu, Sm, Y, Tl, Na, Ag, Cu and Mg, and each of the a, the b and the e represents a numeric value in a range of $0 \leqq a < 0.5$, $0 \leqq b < 0.5$ and $0 \leqq e < 0.2$.]

At least one layer of an adhesive layer in order to adhere the photostimulable phosphor layer may be applied on the support, and the adhesive layer comprises a polymer material having TG (glass transition point) of 80 to 350° C.

Where the adhesiveness of the photostimulable phosphor layer for the support is represented by the peel strength of the photostimulable phosphor layer from the support and, for example, increase of the peel strength means improvement of the adhesiveness.

Further, the support may have a structure of a polyimide layer, a carbon fiber layer and a polyimide layer in the listed order.

According to the first aspect of the present invention, the homogeneity of an activator in a photostimulable phosphor layer can be improved, and a radiographic image conversion panel having high luminance and high sharpness also can be provided.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENTS

Figure 1:
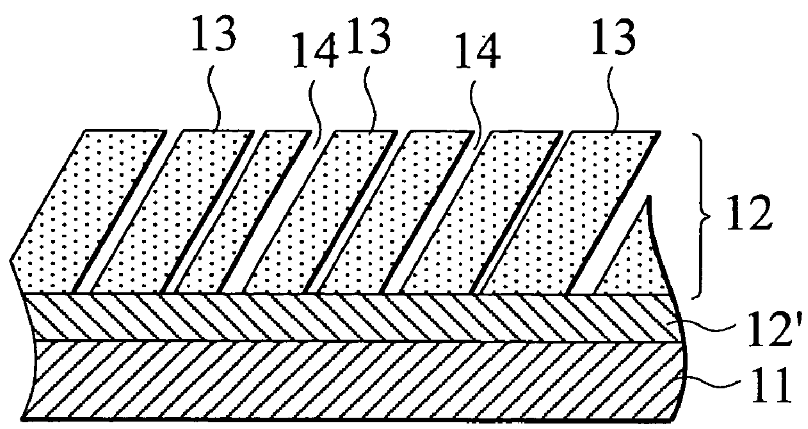
FIG. 1 is a schematic cross section view showing an example of a photostimulated phosphor layer including columnar crystals formed on a support.

Hereinafter, the present invention is further explained in detail.

A radiographic image conversion panel of the present invention comprises support having multiple layers of two or more.

Namely, in the present invention, a support has a multiple-layered structure in order to obtain low X-ray absorption and superior flatness. Further, the support in which film sheet having X ray absorption of less than 10% at 80 kVp are formed to be multiple layers is preferable.

A multiple-layered support comprising a carbon fiber sheet, which is preferably used in the present invention, is manufactured by adhering a film sheet with high accuracy of the surface during a deposition to a carbon fiber sheet with high rigidity.

As for the film sheet, for example, not only metals such as Cu, Al, stainless and the like, but also polymer materials such as polyimide, PET (polyethylene terephthalate) and the like is available.

In the present invention, a support comprising polyimide/carbon fiber sheet/polyimide composition is preferable in a point of effectiveness to the present invention.

The polyimide, such like Mictron film and Kapton film (Du Pont-Toray co., ltd) as examples is available, and is adhered to a carbon fiber sheet to be a base plate.

A method of adhering a polyimide to the surface of a base plate includes the method of adhering Mictron (polyimide sheet) using polyimide resin as a adhesion layer, the method of sandwiching a carbon fiber sheet between polyimide sheets successively forming simultaneously with press-forming the carbon fiber sheet, and the like.

1. Adhering Method

An adhering method is one that polyimide is adhered to a carbon fiber sheet after an adhesive is applied to a polyimide sheet as an adhesive layer, or after an adhesive sheet is adhered to a polyimide sheet.

2. A Method of Press Forming

A plurality of carbon fiber sheets impregnated with epoxy resin or bismaleimide resin are stacked to be required thickness, are sandwiched by polyimide sheets, and are shaped with heat and pressure forming apparatus at a temperature of 150 to 300° C., under a pressure of $9.8\times10^5$ to $6.9\times10^6$ Pa (line pressure of 70 kg/cm$^2$) and for time period of 15 min to 3 hours.

A support having a structure of polyimide/carbon fiber sheet/polyimide three layers as the embodiment of the present application is manufactured by the latter method.

As for the thickness of the polyimide sheet, more than 50 μm is preferable in order to reduce asperity of the surface of the base plate, and 200 μm or less is preferable from a viewpoint of handling in manufacturing.

As for the thickness of a carbon fiber sheet, more than 0.1 mm is preferable from a viewpoint of rigidity, and less than 5 mm is preferable from a viewpoint of X ray absorption.

The invention described in claim 3 comprises at least one of the adhesive layers to adhere a photostimulable phosphor layer, which is a polymer material of 80 to 350° C. of TG. Where the adhesiveness of the photostimulable phosphor layer for the support is represented by the peel strength of the photostimulable phosphor layer from the support and, for example, increase of the peel strength means improvement of the adhesiveness. Therefore, it is suggested that the phosphor in a phosphor layer will distribute evenly since an adhesive layer can obtain superior flatness.

Where to distribute evenly is defined as that the concentrations of an activator is homogeneous in support side and phosphor surface side of the phosphor layer.

Concretely, the difference of the concentrations of an activator in support side and phosphor surface side of the phosphor layer has a margin of error of 10% one-way and other. As for the identification method, approximately 100 μm thickness of a phosphor layer is scratched both from support side and from surface side of a formed phosphor layer of 500 μm thickness. Each sample is dissolved in pure water to be solution respectively, and is analyzed by ICP to measure the concentration of an activator.

Next, a photostimulable phosphor represented by the following formula (1), which is preferably used in the present invention, will be explained.

$$M^1X \cdot aM^2X' \cdot bM^3X'':eA \qquad \text{General formula (1)}$$

As for the photostimulable phosphor represented by the former-described formula (1), $M^1$ represents at least one kind of alkali metal selected from Li, Na, K, Rb, Cs and the like. Among them, at least one kind of alkali metal selected from Rb and Cs is preferable, and Cs is more preferable.

$M^2$ represents at least one kind of bivalent metal selected from Be, Mg, Ca, Sr, Ba, Zn Cd, Cu, Ni and the like. Among them, a bivalent metal selected from Be, Mg, Ca, Sr and Ba is preferable.

$M^3$ represents at least one kind of trivalent metal selected from Sc, Y, La, Ce, Pr, Nd, Pm, Sm, Eu, Gd, Tb, Dy, Ho, Er, Tm, Yb, Lu, Al, Ga, In and the like. Among them, a trivalent metal selected from Y, Ce, Sm, Eu, Al, La, Gd, Lu, Ga and In is preferable.

A represents at least one kind of metal selected from Eu, Tb, In, Ce, Tm, Dy, Pr, Ho, Nd, Yb, Er, Gd, Lu, Sm, Y, Tl, Na, Ag, Cu and Mg.

From the viewpoint of improving photostimulated luminescence luminance of a photostimulable phosphor, X, X' and X" represent at least one kind of halogen selected from F, Cl, Br and I, among them, preferably at least one kind of halogen selected from Br and I. At least one kind of halogen selected from Br and I is more preferable.

In the chemical compound represented in the general formula (1), a is $0 \leqq a < 0.5$, preferably $0 \leqq a < 0.01$, and b is $0 \leqq b < 0.5$, preferably $0 \leqq b \leqq 10^{-2}$, and e is $0 < e \leqq 0.2$, preferably $0 < e \leqq 0.1$.

The photostimulable phosphor represented by the general formula (1) is manufactured by the following method as an example.

First, Acids (HI, HBr, HCl and HF) are added to carbonates solution to be the following composition and stirred. The solution is filtrated at neutral point. Thereafter, the water content of the filtrate is evaporated to obtain the crystal described below.

Concretely, used as for the materials of the phosphor are;

(a) at least one kind of chemical compound selected from NaF, NaCl, NaBr, NaI, KF, KCl, KBr, KI, RbF, RbCl, RbBr, RbI, CsF, CsCl, CsBr and CsI, (b) at least one kind of chemical compound selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 . 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, CuI, $NiF_2$, $NiCl_2$, $NiBr_2$ and $NiI_2$, and (c) a halide compound having at least one kind of trivalent metal selected from Sc, Y, La, Ce, Pr, Nd, Pm, Sm, Eu, Gd, Tb, Dy, Ho, Er, Tm, Yb, Lu, Al, Ga and In.

(d) As for materials of the activator, a compound having a metal selected from Eu, Tb, In, Cs, Ce, Tm, Dy, Pr, Ho, Nd, Yb, Er, Gd, Lu, Sm, Y, Tl, Na, Ag, Cu and Mg.

The phosphor materials of above-described (a) to (d) are weighed so that the factors a, b and c in the mixed composition according to the general formula (1) are within the above-described ranges, and dissolved in pure water.

Where the materials can be mixed with mortar, ball mill, mixer mill and the like. After the pH value C is regulated to $0 < C < 7$ with a predefined acid, water content of the solution is evaporated.

Successively the obtained material mixture is filled into a heat-proof container such as a quartz crucible or an alumina crucible and is calcined in an electric furnace. The preferable calcining temperature is 500 to 1000° C. The preferable calcining time, which depends on filling amount of the material mixture, the calcining temperature and the like, is 0.5 to 6 hours.

As for the calcining atmosphere, mild reducing atmosphere such as nitrogen gas atmosphere containing small amount of hydrogen gas, carbon dioxide gas atmosphere containing small amount of carbon monoxide and the like, neutral atmosphere such like argon gas atmosphere, nitrogen atmosphere and the like and mild oxidizing atmosphere such like atmosphere containing small amount of oxygen gas are preferable.

The luminescence luminance of the phosphor can be enhanced by the process as follows. After the material mixture is calcined in the above-described calcining condition, the calcined sample carried out from an electric furnace is grinded and successively re-calcined in as the same condition as described above. Besides, in cooling the calcined sample from the calcined temperature to room temperature, a desired phosphor can be obtained in both ways that calcined sample is carried out from the electric furnace and cooled under air, and is cooled under mild reducing atmosphere or neutral atmosphere as same atmosphere as calcining. Furthermore, photostimulated luminescence luminance of the obtained phosphor can be further enhanced with the process as follows. The calcined sample is moved from heating position to cooling position in electric furnace and quenched under mild reducing atmosphere, neutral atmosphere, or mild oxidizing atmosphere.

A photostimulated phosphor layer of the present invention is formed by vapor phase method.

The vapor phase method for forming a photostimulable phosphor includes a deposition method, a Sputtering method, a CVD method and a ion plating method.

The following methods can be given as examples in the present invention.

As for the first method, a deposition method can be given. A support is set in a deposition apparatus and the inside of the apparatus is vacuumed to be degree of vacuum of $1.333 \times 10^{-4}$ Pa.

Successively at least one of the former-described photostimulable phosphor is deposited with resistance heating method, electron beam method or the like to be developed the photostimulable phosphor of desired thickness on the surface of the above-described support.

As a result, a photostimulable phosphor layer without any binder is formed. The above-described deposition process can be separated into a plurality of processes to form the photostimulable phosphor layer.

In the above-described deposition process, the phosphor materials can be co-deposited with a plurality of resistance heaters or electron beams to form a photostimulable phosphor layer and simultaneously to synthesize a photostimulable phosphor on a support.

After the deposition, a protective layer is applied on the opposite side of a support side of photostimulable phosphor layer according to need. Thus, a radiographic image conversion panel of the present invention is manufactured. Another process is available that a photostimulable phosphor layer is formed on a protective layer and a support is successively applied.

In the above-described deposition method, materials to be deposited (a support, a protective layer or an intermediate layer) can be heated or cooled, if necessary.

Furthermore, the photostimulable phosphor layer can be heat-treated after the deposition. Also in the above-described deposition method, reactive deposition can be applied, in which gases such like $O_2$, $H_2$ and the like are introduced and deposited.

As for the second method, a sputtering method can be given. A support comprising protective layer or intermediate layer is set in a spattering apparatus as same as the deposition method. The inside of the apparatus is vacuumed to be degree of vacuum of about $1.333\times10^{-4}$ Pa. Successively inert gas such like Ar, Ne and the like as sputtering gas is introduced into the sputtering apparatus to be gas pressure of approximately $1.333\times10^{-1}$ Pa. Then a sputtering is performed with the above-described photostimulable phosphor as a target to develop photostimulable phosphor layer of desired thickness on the above-described support.

In the above-described sputtering process, various types of applied treatment can be applied to as same as the deposition method.

CVD method as the third method and ion plating method as the fourth method are given.

Further, growth rate of the photostimulable phosphor layer in the above-described vapor phase growth is preferably between 0.05 μm/min to 300 μm/min. The growth rate of less than 0.05 μm/min is not preferable since the productivity of the radiographic image conversion panel of the present invention is low. The growth rate of over 300 μm is not preferable since the growth rate is hard to control.

When a radiographic image conversion panel is obtained by the above-described vacuum deposition method, sputtering method or the like, the packing density of a photostimulable phosphor can be increased because a binder is absent. As a result, a preferable radiographic image conversion panel is obtained from a viewpoint of sensitivity and resolution.

As for the film thickness of the above-described photostimulable phosphor layer, depending on an intended use of the radiographic image conversion panel and type of the photostimulable phosphor, is 50 μm to 10 mm from a viewpoint of the effectiveness of the present invention, and 50 to 300 μm is preferable. 100 to 300 μm is more preferable, and 150 to 300 μm is particularly preferable.

In manufacturing the photostimulable phosphor layer by the above-described vapor phase method, the temperature of a support on which photostimulable phosphor layer is formed is set at preferably 100° C. or more. 150° C. or more is more preferable, and 150 to 400° C. is particularly preferable.

Furthermore, from a viewpoint of obtaining a radiographic image conversion panel having high sharpness, the reflectance of the photostimulable phosphor layer of the present invention is preferably 20% or more. 30% or more is more preferable, and 40% or more is particularly preferable. Where, 100% is upper limit.

Furthermore, a filling material such like a binder can be filled into the void of columnar crystals to reinforce the photostimulable phosphor layer. A substance having high light absorptivity and high light reflectance can be also filled. These substances are effective not only in reinforcement but also in reduction of horizontal light diffusion of photostimulated excitation light entered to a photostimulable phosphor layer.

Concrete examples of a support used in a radiographic image conversion panel of the present invention will be described.

As for the support used in a radiographic image conversion panel of the present invention, various types of glass, polymer materials, metals and the like are used. For example, preferable are plate glasses made of such like quartz, borosilicate glass, chemically toughened glass and the like, plastic films such like cellulose acetate film, polyester film, polyethylene terephthalate film, polyamide film, polyimide film, triacetate film, polycarbonate film and the like and metal sheet such like aluminum sheet, iron sheet, cupper sheet and the like or metal sheet with coating layer of metal oxide of the above-described metals.

The surface of these supports can be smooth, but also can be mat in order to improve adhesive property between the support and the photostimulable phosphor layer.

Furthermore, in the present invention, adhesive layer can be previously provided onto the surface of the support according to need in order to improve adhesive property between the support and the photostimulable phosphor layer. The thickness of these supports, depending on the materials of the support, is generally 80 μm to 2000 μm. 80 μm to 1000 μm is more preferable from the viewpoint of handling.

Further, the photostimulable phosphor layer of the present invention can comprise a protective layer.

Next, the formation of the photostimulable phosphor layer of the present invention will be described with FIGS. 1 and 2.

FIG. 1 is a schematic section view showing an example of a photostimulable phosphor layer having columnar crystal formed on a support manufactured by the above-described deposition method. 11, 12 (12') and 13 designate a support, a photostimulable phosphor and a columnar crystal constituting the photostimulable phosphor layer respectively. 14 designates the void formed between the columnar crystals.

Figure 2:
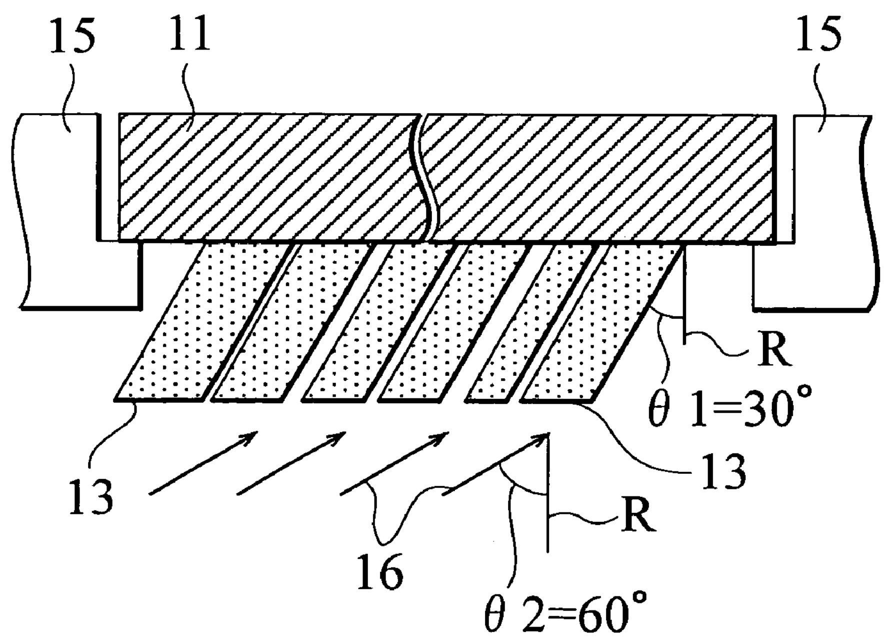
FIG. 2 is an aspect of forming a photostimulable phosphor layer on a support with a deposition method.

FIG. 2 shows a feature that a photostimulable phosphor layer is formed by deposition on support 11 which is held by support holder 15. θ2 designates the incident angle of flow direction of photostimulable phosphor vapor 16 based on a normal line (R) of the surface of the support (incidents at 60° in FIG. 2). θ1 designates the angle of longitudinal direction of the formed columnar crystal based on normal line (R) of the surface of the support (θ1 is 30° in FIG. 2. Experimentally θ1 becomes approximately half.). The columnar crystals are formed along with this direction.

The photostimulable phosphor layer formed on the support as described above has high directivity because of including no binder. As a result, it is possible to manufacture a thick photostimulable phosphor layer of a radiographic image conversion panel comprises a photostimulable phosphor layer of disperse type in which a photostimulable phosphor is dispersed in a binder. In addition, the sharpness of an image is improved since dispersion of photostimulated excitation light in the photostimulable phosphor layer is decreased.

Furthermore, a filling material such like a binder can be filled into the void of columnar crystals to reinforce the photostimulable phosphor layer. A substance having high light absorptivity and high light reflectance can be also filled. These substances are effective not only in reinforcement but also in reduction of horizontal light diffusion of photostimulated excitation light entered to a photostimulable phosphor layer.

Here, substances having high light reflectance designate substances having high light reflectance for photostimulated excitation light (500 to 900 nm, especially 600 to 800 nm). Aluminum, magnesium, silver, indium, other metals, white pigments and coloring materials of green to red can be given as examples. White pigments can also reflect photostimulated luminescence.

As for the white pigments, $TiO_2$ (anatase and rutile type), MgO, $PbCO_3$, $Pb(OH)_2$, $BaSO_4$, $Al_2O_3$, $M_{(II)}FX$ ($M_{(II)}$ is at least one kind of element selected from Ba, Sr and Ca, and X is either Cl or Br.), $CaCO_3$, ZnO, $Sb_2O_3$, $SiO_2$, $ZrO_2$, lithopone ($BaSO_4$.ZnS), magnesium silicate, anionic silicosulfate, anionic lead phosphate and aluminum silicate are given as examples.

These white pigments disperse photostimulated luminescence easily by reflection or refraction of light since they have high hiding power and refractive index. As a result, these substances can improve the sensitivity of the radiographic image conversion panel markedly.

As for the substances of high absorptivity, such like carbon black, chromium oxide, nickel oxide and iron oxide, and blue color materials are given as examples. Among them, carbon black also absorbs photostimulated luminescence.

Further, both organic and inorganic system color materials are available as the color materials described above. As the organic system color materials, Zabon Fast Blue 3G (produced by Hoechst), Estrol Brill Blue N-3RL (produced by Sumitomo Chemical), D & C Blue No. 1 (produced by National Aniline), Spirit Blue (produced by Hodogaya Chemical), Oil Blue No. 603 (produced by Orient), Kiton Blue A (produced by Chiba-Geigy), Aizen Catiron Blue GLH (produced by Hodogaya Chemical), Lake Blue AFH (produced by Kyowa Sangyo), Primocyanine 6GX (produced by Inabata & Co.), Brill Acid Green 6BH (produced by Hodogaya Chemical), Cyan Blue BNRCS (produced by Toyo Ink), Lionoil Blue (produced by Toyo Ink) and the like can be used.

Further, organic system metal complex salt color materials such as color index Nos. 24411, 23160, 74180, 74200, 22800, 23154, 23155, 24401, 14830, 15050, 15760, 15707, 17941, 74220, 13425, 13361, 13420, 11836, 74140, 74380, 74350, 74460 and the like can be given.

As for the inorganic system color materials, for example, inorganic pigment such as permanent blue, cobalt blue, cerulean blue, chromium oxide, $TiO_2$—ZnO—Co—NiO system and the like can be given.

Further, a photostimulable phosphor layer of the present invention can comprise a protective layer.

A protective layer can be manufactured by applying an embrocation of the protective layer directly to the photostimulable phosphor layer, adhering a separately formed protective layer is adhered to the photostimulable phosphor layer, or forming a photostimulable phosphor layer is directly formed on a previously formed protective layer.

As for materials of the protective layer, general materials for a protective layer is used such as cellulose acetate, nitrocellulose, polymethyl methacrylate, polyvinyl butyral, polyvinyl folmal, polycarbonate, polyester, polyethylene terephthalate, polyethylene, polyvynilidene chloride, nylon, polytetrafluoroethylene, polytriflurochloroethylene, tetrafluoroethylene-hexafluoropropylene copolymer, vinylidene chloride-vinyl chloride copolymer, vinylidene chloride-acrylonytrile copolymer and the like. A transparent glass sheet is also available as a protective layer.

Further, the protective layer can be formed by laminating inorganic materials such as SiC, $SiO_2$, SiN and $Al_2O_3$ and the like in deposition method of sputtering method or the like.

The layer thickness of these protective layers is preferably 0.1 to 2000 μm.

Figure 3:
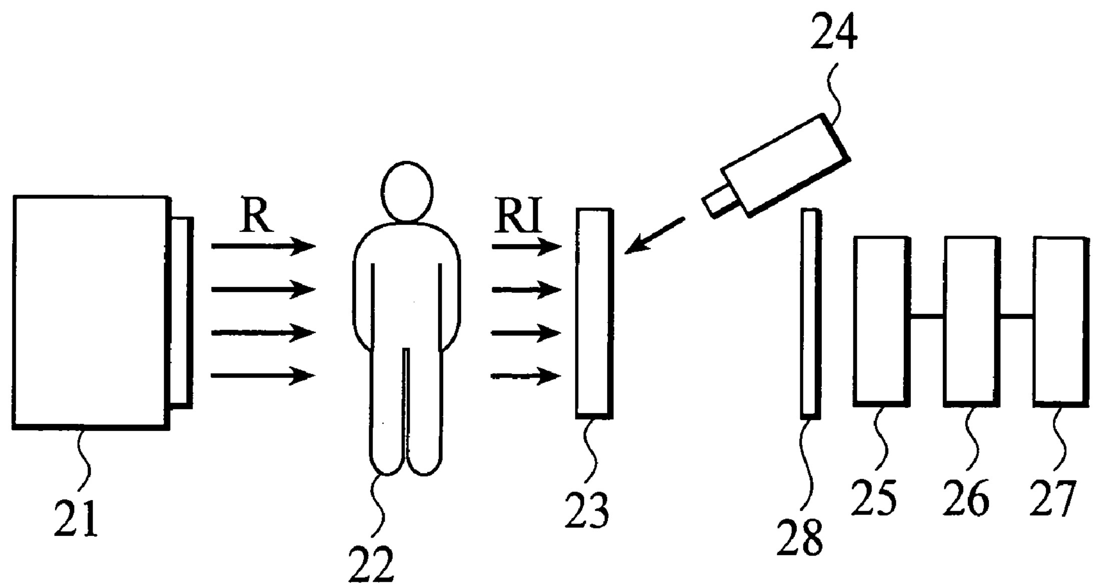
FIG. 3 is a schematic view showing an example of a configuration of a radiographic image conversion panel of the present invention.

FIG. 3 is a schematic view showing an example of a structure of radiographic image conversion panel according to the present invention.

In FIG. 3, 21 designates a radial ray generator, 22 designates a subject, 23 designates a radiographic image conversion panel comprising a visible or infrared light photostimulable phosphor layer having a photostimulable phosphor, 24 designates a photostimulated excitation light source to emit a radial ray latent image of radiographic image conversion panel 23 as photostimulated luminescence, 25 designates a photoelectric converter to detect the photostimulated luminance emitted from a radiographic image conversion panel 23, 26 designates a image playback equipment to replay photoelectric signals detected by a photoelectric converter 25 as an image, 27 designates a image display unit which display the reproduced image, 28 designates a filter that cut the reflected light and transmit the light only emitted from a radiographic image conversion panel 23.

In addition, FIG. 3 shows an example of obtaining a radial ray transmitted image of a subject. When a subject 22 itself radiates radial ray, the above-described radial ray generator 21 is not particularly required.

The photoelectric converter 25 or later have only to replay information of light as an image of some kind, and are not limited to the above-described system.

As shown in FIG. 3, the subject 22 is set between a radial ray generator 21 and a radiographic image conversion panel 23, and radial ray R is radiated. Then radial ray R transmits a subject 22 according to a variety of transmittance of the each part in the subject 22. The transmission image RI (that is, an image of strong and weak of radial ray) incidents to a radiographic image conversion panel 23.

A photostimulable phosphor layer of the radiographic image conversion panel 23 absorbs the incidented transmission image RI. Then electrons and/or pores, the number of which is proportional to the amount of radiation absorbed in photostimulable phosphor layer, are generated to accumulate the trap level of a photostimulable phosphor.

That is, a latent image in which the energy of a transmitted radial ray image is accumulated is formed. Succusesively the latent image is elicited by excitation of light energy.

A photostimulated excitation light source 24 irradiates visible or infrared light to a photostimulable phosphor layer. The electrons and/or pores accumulated in the trap level are flushed and accumulated energy is emitted as photostimulated luminescence.

The strength of the emitted photostimulated luminescence is proportional to the number of the accumulated electron and/or pores, e.g. the amount of radial ray energy absorbed in a photostimulable phosphor layer of the radiographic image conversion panel 23. This light signal is converted to an electric signal with a photoelectric converter 25, for example, such as a photoelectric multiplier, subsequently replayed with an image playback equipment 26, and displayed with an image display 27.

The image playback equipment 26 is more effective if it does not simply replay an electric signal as an image signal, but also can perform so called image processing and calculation, memory and storage of an image.

The emitted photostimulable luminescence desirably has the spectrum distribution in as shorter wavelength band as possible. Because a light is required to be separated into reflection light of photostimulated excitation light and photostimulated luminescence emitted from a photostimulable phosphor layer when it is exited by light energy, and a photoelectric converter which detects the luminescence emitted from photostimulable phosphor layer generally has higher sensitivity for light energy of wavelength 600 nm or less.

The photostimulable phosphor of the present invention fills the above-described parameters simultaneously, since the luminescence wavelength band of the photostimulable phosphor of the present invention is between 300 and 500 nm while the photostimulated excitation wavelength band is between 500 and 900 nm. In resent years, since diagnostic unit has been downsized, a laser diode, which has high power output and is to be compacted easily, is preferably used, and the preferable wavelength of the laser diode is 680 nm. The photostimulable phosphor applied to the radiographic image conversion panel of the present invention shows remarkably fine sharpness when excitation wavelength is 680 nm.

In other words, every photostimulable phosphor of the present invention shows a luminescence having the main peak thereof at 500 nm or less. Since the luminescence is easily separated from excitation light and the wavelength of the luminescence accords with spectral sensitivity of a photodetector, the photostimulated luminescence is effectively detected. As a result, the sensitivity of image receiving system is improved because of high efficiency of light detection.

A spectrum of a light source used in photostimulated excitation light source 24 includes photostimulated excitation wavelength the photostimulable phosphor used in a radiographic image conversion panel 23.

Particularly, when a laser diode is used, the optical system becomes simple and the excitation light luminance becomes high. Since efficiency of photostimulated luminescence is improved, more preferable results can be obtained.

For example, as for the laser, He—Ne laser, He—Cd laser, Ar ion laser, Kr ion laser, $N_2$ laser, YAG laser and its second harmonic, ruby laser, semiconductor laser, all kinds of dye laser, metal vapor laser such as cupper vapor laser and the like can be applied. Normally continuous oscillation laser such like He—Ne laser and Ar ion laser is desirable. Pulse oscillation laser is also available when and the pulse of laser is synchronized with scanning cycle of each pixel in a panel.

If a delay of a luminescence is utilized to separate a light, as disclosed in JP-Tokukaisho-59-22046A, pulse oscillation laser is more preferable than modulated continuous oscillation laser.

In the above-described laser light sources, semiconductor laser is particularly preferably available because of its small size, affordable price and furthermore needlessness of a modulator.

A filter 28 is selected according to a combination of photostimulated luminescence wavelength of a photostimulable phosphor included in a radiographic image conversion panel 23 and photostimulated excitation light wavelength of photostimulated excitation light source 24, since the filter transmits the photostimulated luminescence emitted from a radio graphic image conversion panel 23 and intercept photostimulated excitation light.

For example, in practically preferable combination such that excitation wavelength is 500 to 900 nm and photostimulated luminance wavelength is 300 to 500 nm, glass filters from blue to violet such as C-39, C-40, V-40, V-42 and V-44 (Toshiba Co. ltd.), 7-54 and 7-59 (Corning Co. Ltd.), BG-1, BG-3, BG-25, BG-37 and BG-38 (Spectrofilm Co. Ltd.) and the like are available as the filter. An interference filter having any property on some level also can be used. As for the photoelectrical converter 25, any devices that convert variation of light intensity to that of electric signal are available such as photoelectric tube, photoelectric multiplier, photodiode, phototransistor, solar battery, photoconductive cell and the like.

<Embodiments>

Hereinafter, the examples of the present invention will be explained. However, the present invention is not limited to these examples.

Embodiment 1

<<Preparation of Radiographic Image Conversion Panel Sample 1 to 10 (Described as Comparative Examples 1 and 2, and Examples 1 to 8 in Table 1)>>

Figure 4:
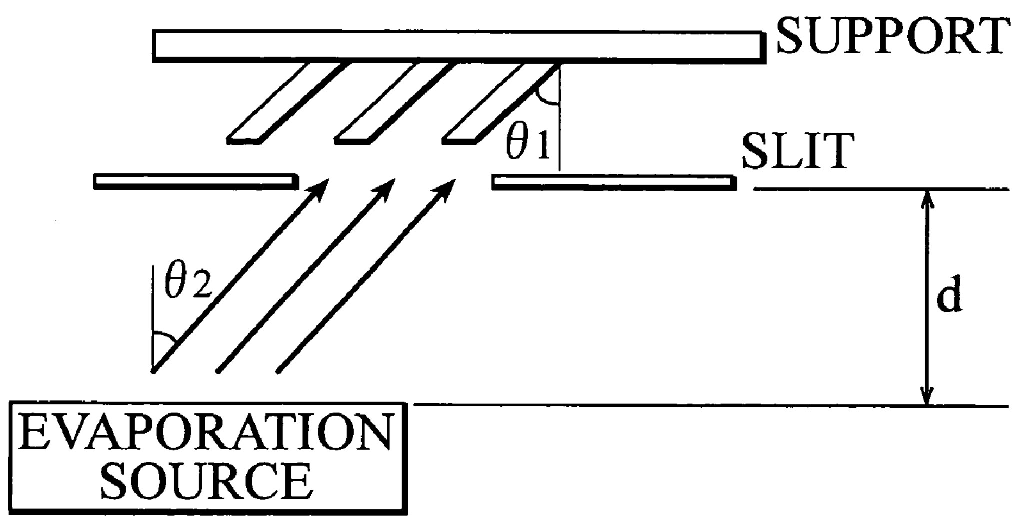
FIG. 4 is a schematic view showing an example of a manufacturing method of photostimulable phosphor layer on a support with deposition.

In the condition shown in Table 1, a photostimulable phosphor layer having photostimulable phosphor (CsBr:Eu) was formed on the surface of a support made of glass ceramics (Produced by Japan Electric Glass Co., Ltd.) of 200 μm thickness by the deposition apparatus shown in FIG. 4 (configured θ1=5° and θ2=5°).

In addition, the deposition was performed in such manners that: aluminum slit is used, the distance between a support and slit is adjusted to 60 cm, and a support is conveyed in a direction parallel to a support in the course of the deposition. The thickness of the photostimulable phosphor layer was regulated to 300 nm.

In the deposition, the above-described support was set in the deposition device first. Then material of photostimulable phosphor (CsBr:Eu) was press molded and put into a water-cooled crucible as a vapor source.

Next, inside of the device was vacuumed, and subsequently $N_2$ gas was introduced to be degree of vacuum of 1.333. The deposition was carried out with keeping gas density of 0.1785 g/cm$^3$ and temperature of the support of 350° C. The deposition was finished when the thickness of a photostimulable phosphor layer reaches 300 μm. Successively this phosphor layer was heated at 400° C.

The obtained photostimulable phosphor layer was covered with a protective layer having borosilicate glass under dry air atmosphere. Peripheral part of a support and the protective layer was sealed with an adhesive. Thus the radiographic image conversion panel Sample 1 (comparative example 1) where a phosphor layer is sealed was obtained.

The radiographic image conversion panel samples 2 to 10 (comparative example 2 and examples 1 to 8) are prepared as same as the radiographic image conversion panel sample 1 except the base material (support) and amount of X ray absorption was changed according to Table 1. Obtained radiographic image conversion panel samples 1 to 10 of radiographic image conversion panels is evaluated as described below.

A three-layered support, or practical example 7, is manufactured as follows. Carbon fiber sheet of 2 mm thickness (CFRP sheet: Toray Ind. Inc.) is sandwiched by two polyimide sheets. The stacked sheets are pressed for 15 min at the temperature of 200° C. and in the pressure of 20 kg/cm$^3$, and subsequently annealed to 100° C. to be a three-layered support.

A two-layered support, or example 8, is manufactured by the adhering method. A carbon fiber sheet (CFRP sheet: Toray Ind. Inc.) is adhered to a polyimide sheet with approximate amount of polyvinyl alcohol (molecular weight of 20,000) applied on the polyimide sheet.

A carbon fiber sheet (2 mm thickness) has Tg of 180° C. and a polyimide sheet (Mictron film: Du Pont-Toray co., ltd) has thickness of 100 μm and Tg of 280° C.

<<Evaluation of Sharpness>>

The sharpness of the each radiographic image conversion panel samples was evaluated by measuring the modulation transfer function (MTF).

After a CTF chart was stuck onto the radiographic image conversion panel sample, 10 mR of 80 kVp X-ray (the distance to the subject: 1.5 m) was irradiated to the radiographic image conversion panel sample. Thereafter, the CTF chart image was scanned and read by using a semiconductor laser having a diameter of 100 μmϕ (680 nm: the power on the panel was 40 mW). Thus, the MTF was obtained. The values in the Table are the values such that 2.01 p/mm of MTF value was added together.

<<Evaluation of Luminance and Luminance Distribution>>

The luminance was evaluated by using the Regius 350 produced by Konica Corporation.

An X-ray was irradiated with a tungsten bulb of 80 kVp and 10 mAs and 2 m of the distance between an exposure source and the plate, as same as the evaluation of sharpness. Thereafter, the plate was set to the Regius 350 to read the luminance. Relative evaluation was performed based on the electric signals obtained from a photoelectric multiplier.

The distribution of electric signals in detected area obtained by photomultiplier is relatively evaluated and standard deviation is calculated to be a luminescence distribution (S.D.) of each sample. Where, it can be said that the smaller value means more superior homogeneity of an activator.

The results of the evaluation of the sharpness of an image and luminescence luminance and luminance distribution according to each above-described radiographic image conversion panel are shown in Table. 1.

Thus, it is obvious that the examples of the present invention are superior to comparative examples.

The entire disclosure of Japanese Patent Applications No. 2003-067862 filed on Mar. 13, 2003, including specification, claims, drawings and summary are incorporated herein by reference in its entirety.

What is claimed is:

1. A radiographic image conversion panel comprising one or more photostimulable phosphor layers on a support, wherein;

at least one of the photostimulable phosphor layers is formed by a vapor phase method and has a film thickness of 5 μm to 10 mm, the support comprises a plurality of layers a first polyimide layer, a carbon fiber layer and a second polyimide layer arranged in an order of the first polyimide layer, the carbon fiber layer and the second polyamide layer, at least one adhesive layer between said support and photostimulable layer, in order to adhere the photostimulable phosphor layer to said support, wherein the one adhesive layer comprises a polymer material having glass transition point of 80 to 350° C.

TABLE 1

| | AMOUNT OF X RAY ABSORPTION | | | | LUMINANCE |
|---|---|---|---|---|---|
| | BASE MATERIAL | 80 kVp (%) | LUMINANCE | MTF (21 p/mm) | DISTRIBUTION S.D. |
| COMPARATIVE EXAMPLE 1 | GLASS | 28 | 0.51 | 23% | 18 |
| COMPARATIVE EXAMPLE 2 | Al | 34 | 0.42 | 21% | 10 |
| EXAMPLE 1 | Al + POLYIMIDE | 4 | 1.22 | 32% | 7 |
| EXAMPLE 2 | Cu + POLYIMIDE | 6 | 1.43 | 36% | 8 |
| EXAMPLE 3 | STAINLESS + POLYIMIDE | 6 | 1.54 | 35% | 6 |
| EXAMPLE 4 | Al + PET | 4 | 1.33 | 33% | 4 |
| EXAMPLE 5 | Cu + PET | 6 | 1.56 | 36% | 3 |
| EXAMPLE 6 | STAINLESS STEAL + PET | 6 | 1.65 | 35% | 4 |
| EXAMPLE 7 | POLYIMDE/CARBON FIBER/ POLYIMIDE | 2 | 1.75 | 42% | 3 |
| EXAMPLE 8 | CARBON FIBER/POLYIMIDE | 2 | 1.72 | 41% | 5 |

As is obvious from Table 1, compared with radiographic image conversion panels of comparative examples 1 and 2 both of which has a single-layered support, the sharpness of an image and the luminescence luminance of the photostimulated phosphor can be improved by making the support multi-layered (examples 1 to 8). In addition, the variation of luminescence can be lowered since the homogeneity of the activator in the photostimulable phosphor layer is improved. That is, in the two-layered support, the rigidity of the support having a carbon fiber sheet (example 8) can be improved due to the carbon fiber sheet compared with the supports having aluminum, copper, and stainless (example 1 to 3). Therefore, equalization of the film thickness of the photostimulable phosphor layer, e.g. equalization of the activator in the photostimulable phosphor layer can be achieved.

Furthermore, when the support is made up of three-layered structure of polyimide—carbon fiber sheet—polyimide (example 7), the flatness of the support is more improved than that two-layered support (example 8). Therefore, the homogeneity of the activator in the photostimulable phosphor layer is further improved by lowering the luminescence variation as well as the sharpness of an image and the luminescence of the photostimulable phosphor is further improved.

2. The panel of claim 1, wherein at least one layer of the photostimulable phosphor layers comprises a photostimulable phosphor in which an alkali halide represented by the following general formula (1) is a base material;

$$M^1X \cdot aM^2X' \cdot bM^3X'':eA \qquad \text{general formula (1)}$$

wherein the $M^1$ is at least one kind of alkali metal selected from a group of Li, Na, K, Rb and Cs, the $M^2$ is at least one kind of bivalent metal selected from a group of Be, Mg, Ca, Sr, Ba, Zn, Cd, Cu and Ni, the $M^3$ is at least one kind of trivalent metal selected from a group of Sc, Y, La, Ce, Pr, Nd, Pm, Sm, Eu, Gd, Tb, Dy, Ho, Er, Tm, Yb, Lu, Al, Ga and In, each of the X, the X' and the X" is at least one kind of halogen selected from F, Cl, Br and I, the A is at least one kind of metal selected from a group of Eu, Tb, In, Ce, Tm, Dy, Pr, Ho, Nd, Yb, Er, Gd, Lu, Sm, Y, Tl, Na, Ag, Cu and Mg, and each of the a, the b and the e represents a numeric value in a range of $0 \leqq a < 0.5$, $0 \leqq b < 0.5$ and $0 < e < 0.2$.

* * * * *